(12) United States Patent
Monnereau et al.

(10) Patent No.: US 10,259,147 B2
(45) Date of Patent: Apr. 16, 2019

(54) APPARATUS AND METHOD FOR EXTRUDING AN ELASTOMER MIXTURE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Patrice Monnereau, Clermont-Ferrand (FR); Jean-Francois Verjat, Clermont-Ferrand (FR)

(73) Assignees: Compagnie Generale Des Establissements Michelin, Clermont-Ferrand (FR); Michelin Recherche Et Technique, S.A., Granges-Paccot (CH)

(*) Notice: Subject to any disclaimer, the term of this patent is extended or adjusted under 35 U.S.C. 154(b) by 600 days.

(21) Appl. No.: 14/765,041

(22) PCT Filed: Jan. 31, 2014

(86) PCT No.: PCT/EP2014/051958
§ 371 (c)(1),
(2) Date: Jul. 31, 2015

(87) PCT Pub. No.: WO2014/118340
PCT Pub. Date: Aug. 7, 2014

(65) Prior Publication Data
US 2015/0360398 A1    Dec. 17, 2015

(30) Foreign Application Priority Data
Feb. 1, 2013 (FR) ..................... 13 50890

(51) Int. Cl.
B29C 43/24 (2006.01)
B29C 47/00 (2006.01)
(Continued)

(52) U.S. Cl.
CPC .......... B29C 43/245 (2013.01); B29C 43/222 (2013.01); B29C 43/46 (2013.01);
(Continued)

(58) Field of Classification Search
CPC ..... B29C 43/222; B29C 43/245; B29C 43/46; B29C 43/468; B29C 43/58;
(Continued)

(56) References Cited

U.S. PATENT DOCUMENTS 3,890,078 A * 6/1975 Straumanis ............. B29C 47/92
264/40.7
3,930,774 A * 1/1976 Brand ..................... B29C 47/92
264/40.7
(Continued)

FOREIGN PATENT DOCUMENTS

CN    102582087 A    7/2012
EP    1552914        7/2005
(Continued)

OTHER PUBLICATIONS

International Search Report for PCT/EP2014/051958 dated Mar. 17, 2014.

Primary Examiner — Yogendra N Gupta
Assistant Examiner — Joseph S Leyson
(74) Attorney, Agent, or Firm — Dickinson Wright PLLC

(57) ABSTRACT

The extrusion apparatus includes a screw in a fixed barrel. The barrel has a feed inlet and an outlet with an extrusion nozzle which discharges into the nip between first and second rotary rolls that can rotate in opposite directions. The apparatus also has a first means for rotating and a first control means that are able to synchronize the speed of rotation of the first roll and the screw and has a second means that is able to rotate the second screw at a different speed of rotation than the first roll. The first control means
(Continued)

can regulate the speed of rotation of the screw depending on the width of the strip, and a second control means can regulate the speed of rotation of the second roll depending on the thickness of the strip.

11 Claims, 1 Drawing Sheet

(51) Int. Cl.
    *B29C 47/32*     (2006.01)
    *B29C 47/92*     (2006.01)
    *B29C 43/22*     (2006.01)
    *B29C 43/46*     (2006.01)
    *B29C 43/58*     (2006.01)
    *B29K 21/00*     (2006.01)
    *B29L 30/00*     (2006.01)

(52) U.S. Cl.
CPC ............ *B29C 43/58* (2013.01); *B29C 47/004* (2013.01); *B29C 47/0021* (2013.01); *B29C 47/32* (2013.01); *B29C 47/92* (2013.01); *B29C 2043/463* (2013.01); *B29C 2043/468* (2013.01); *B29C 2043/5825* (2013.01); *B29C 2043/5875* (2013.01); *B29C 2947/926* (2013.01); *B29C 2947/92019* (2013.01); *B29C 2947/9259* (2013.01); *B29C 2947/92152* (2013.01); *B29C 2947/92447* (2013.01); *B29C 2947/92885* (2013.01); *B29K 2021/003* (2013.01); *B29L 2030/00* (2013.01)

(58) Field of Classification Search
CPC ... B29C 47/0021; B29C 47/004; B29C 47/32; B29C 47/92; B29C 2947/92019; B29C 2947/92152; B29C 2947/92447; B29C 2947/9259; B29C 2947/926; B29C 2947/92885; B29C 2043/468
See application file for complete search history.

(56) References Cited

U.S. PATENT DOCUMENTS

| | | | |
|---|---|---|---|
| 3,975,126 A | | 8/1976 | Wireman et al. |
| 4,428,896 A | | 1/1984 | Stevenson |
| 5,639,404 A | * | 6/1997 | Meier-Kaiser ....... B29O 43/245 264/175 |
| 5,904,418 A | | 5/1999 | Kaminaga et al. |
| 5,959,737 A | | 9/1999 | Kaminaga et al. |
| 6,152,720 A | * | 11/2000 | Greb .................. B29O 43/245 264/40.5 |
| 2005/0226093 A1 | | 10/2005 | Yada et al. |
| 2009/0057934 A1 | | 3/2009 | Komatubara |

FOREIGN PATENT DOCUMENTS

| | | |
|---|---|---|
| FR | 945134 | 4/1949 |
| FR | 2282993 | 3/1976 |

* cited by examiner

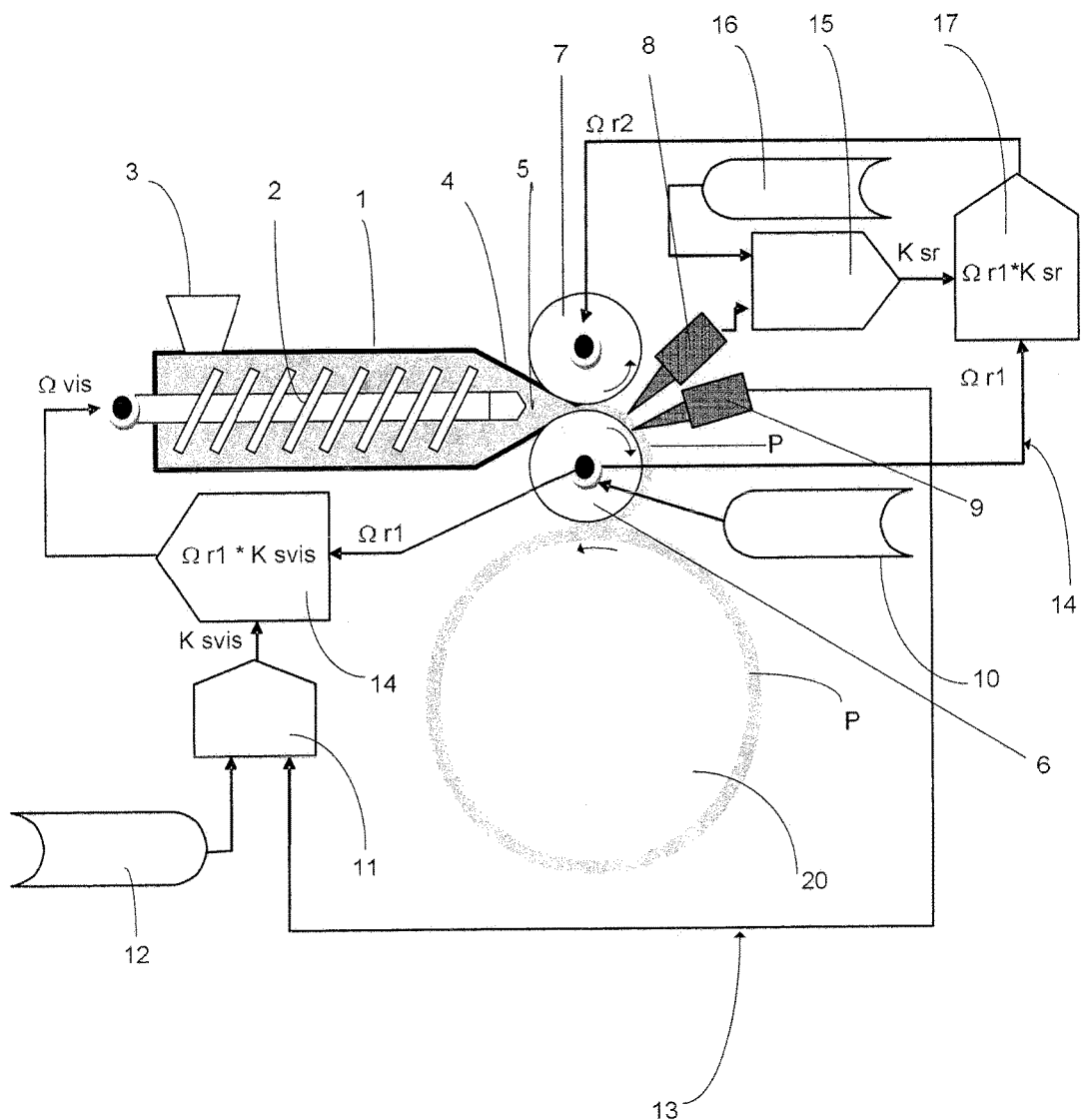

APPARATUS AND METHOD FOR EXTRUDING AN ELASTOMER MIXTURE

This application is a 371 national phase entry of PCT/EP2014/051958, filed 31 Jan. 2014, which claims benefit of French Patent Application No. 1350890, filed 1 Feb. 2013, the contents of which are incorporated herein by reference for all purposes.

BACKGROUND

1. Field

The disclosure relates to the field of the extrusion of elastomer mixtures that are more particularly intended for manufacturing tires.

2. Description of Related Art

As is known, the manufacture of the profiled elements of which tires are formed makes use of extrusion apparatuses, the function of which is to produce strips of rubber to a determined profile. These devices are formed of a barrel and a screw mounted to rotate in said barrel.

The shape of the barrel and of the screw and the arrangement thereof are realized such that the rotating of the screw has the effect of supplying mechanical work to the mixture for the purpose of increasing the fluidity thereof, on the one hand, and of propelling said mixture towards an extrusion die for the purpose of conferring a determined profile on the extruded product, on the other. The extrusion die is generally formed between a fixed profiled blade and a rotary roll or between two rotary rolls that rotate in opposite directions.

The continuous strip leaving the extrusion apparatus can be wound onto storage means with a view to subsequent use or it can directly feed a tire-building device located downstream.

In order to obtain a profiled element having constant dimensions, extrusion apparatuses comprise regulating means that make it possible to act on various parameters, such as the speed of the roll and the pressure in the outlet cavity upstream of the die, the speed of rotation of the screw, and the temperature of the elastomer mixture, depending on measurements carried out on the profiled element downstream of the extrusion apparatus.

The document FR 1563077 describes a method and an extruder for manufacturing strips of thermoplastic material with a regular thickness. The extruder comprises a barrel inside which an extrusion screw rotates, said extrusion screw pushing the material from a feed inlet towards an extrusion die which discharges into a pair of rotary cylinders that rotate in opposite directions, one of the cylinders being motorized. A manometer positioned in the gap between the cylinders or upstream of said gap measures the extrusion pressure and transmits the value thereof to a regulating circuit which adjusts the speed of rotation of the motorized cylinder as a result. The motorized cylinder can thus be slowed down or accelerated so as to keep the extrusion pressure constant in order to obtain an extruded strip with a regular thickness. However, by measuring the dimensions of the cross section of the extruded strip, it has been found that the fluctuations in the extrusion pressure cause not only the thickness but also the width of the extruded strip to vary, specifically in proportions that are different from that of the thickness. As a result, adjusting the speed of the motorized roll in order to obtain a correct thickness is not sufficient for obtaining an extruded strip having a sufficiently precise width.

The document FR 2282993 describes a method and a device for extruding a band of elastomer with the aid of a screw extruder having, at the outlet of a die nozzle, two rolls that are driven in rotation at one and the same speed but in opposite directions, the thickness of the band being determined by the distance between the rolls. By keeping the distance between the rolls fixed, the variation in pressure influences the width of the band. Consequently, the device proposes control means for maintaining the width at a prescribed value. Thus, the width of the band leaving the extruder is measured by way of an electro-optical sensor and compared with a predetermined reference value. Discrepancies with respect to the reference value of the width of the band are used in order to control the speed of the rolls. This makes it possible to vary the pressure depending on the output of the extruder and to obtain a band of constant width. However, by measuring the thickness of the band obtained, it has been observed that the thickness of the band decreases for certain values of the pressure in the cavity of the extruder, upstream of the die nozzle, and when the speed of the rolls increases in order to maintain a constant band width.

Moreover, the device according to said document has the drawback of it not being easily possible to modify the thickness of the band. Specifically, in order to carry out such a modification, it is necessary to stop the device and carry out mechanical adjustments in order to move the rolls towards or away from one another. Such manipulations impose constraints in terms of time and labour costs and have the consequence of a drop in productivity.

Furthermore, the document EP 1 552 914 discloses a machine for kneading a rubber mixture with the aid of two extruders, the outlet of which leads into the nip between two rolls, each roll being provided with means for driving it in rotation. The rolls can be driven in rotation at different speeds in order to orient the rubber strip on one of the rolls or in order to apply a greater shearing action to the rubber mixture. Said document has the same drawback as the preceding document since it makes use of means for regulating the distance between the rolls in order to modify the thickness of the rubber strip obtained.

SUMMARY

The aim of an embodiment of the invention is to remedy the abovementioned drawbacks and to propose an apparatus and a method for extruding an elastomer mixture that makes it possible to obtain a strip of continuously extruded profiled element of which the cross section has dimensions that are precise and constant over time, at variable profiling speeds.

This object is achieved by way of an extrusion apparatus intended for manufacturing a continuous strip of profiled product, comprising a screw that is set in rotation in a fixed barrel having a feed inlet for elastomer mixture and an outlet provided with an extrusion nozzle which discharges into the nip formed between a first rotary roll and a second rotary roll that are made to rotate in opposite directions, the apparatus having first means for rotating the first roll and first control means that are able to synchronize the speed of rotation of the first roll and the speed of rotation of the screw, and second means for rotating the second roll that are able to rotate the latter at a speed of rotation that is different from the speed of rotation of the first roll, characterized in that said first control means are connected to the means for driving the screw in order to regulate the speed of rotation of the screw depending on the width of the strip of profiled product, and in that it comprises second control means connected to said second means for rotating in order to regulate the speed of rotation of the second roll depending on the thickness of said strip.

The extrusion apparatus of an embodiment of the invention has a screw that is driven in rotation in order to discharge an elastomer mixture into the nip formed between two rotary rolls; it is suitable for continuously producing a strip of profiled product with a variable appearance, one of the rolls being used as an applicator roller for application to a downstream device. To this end, a first roll is driven in rotation in order to deposit the strip of extruded profiled product on a downstream device, the speed of rotation of this roll corresponding to the exit speed of the product. The apparatus furthermore comprises first control means which are able to synchronize the speed of rotation of the first roll and the speed of rotation of the screw. In other words, these control means adjust the speed of rotation of the screw depending on the speed of rotation of the first roll in order not to impair the geometry of the extruded product in the event of variations in the mass flow rate of the apparatus. These variations in the flow rate are due either to variations in the mass flow rate of the downstream device, when the extrusion apparatus is directly connected to a downstream device, or to variations in the pressure inside the barrel of the apparatus, upstream of the exit of the extruded product, said variations being, for their part, due to the type of mixture, to the viscosity of the latter or to the temperature conditions inside the barrel of the apparatus. Such synchronization of the speed of the screw and the speed of the first roll is carried out by the first control means depending on measured values of a dimension of the section of the extruded product or depending on measured values of the pressure inside the barrel of the apparatus, upstream of the extrusion nozzle. Thus, by ensuring that the speeds of the screw and of the first roll are synchronized, said first control means control a dimension of the section of the extruded product, for example control the width of the strip of profiled product.

More particularly according to an embodiment of the invention, the extrusion apparatus comprises second means for driving the second roll in rotation, allowing the latter to rotate at a speed of rotation which is different from that of the first roll. In other words, each roll has its own means for driving in rotation, thereby allowing the rolls to rotate independently of one another. The second roll may thus be driven with the aid of the second means for driving at a speed which is established by control means depending on the measured parameters of the extrusion apparatus or of the extruded product, which are different from those for which the speed of the screw has been synchronized with that of the first roll.

Advantageously, the speed of rotation of the second roll is variable independently of the speed of rotation of the first roll.

It is thus possible, by keeping constant the speed of the first roll, which applies the strip of profiled product to the downstream device, to vary the speed of the second roll and thus the flow rate of elastomer mixture in the nip between the two rolls.

Specifically, by carrying out laboratory tests, it is been found that the geometry of the strip of profiled product exiting the nip between the two rolls depends on the speed of the rolls and on the pressure of the mixture upstream of the rolls. In addition, measurements carried out on the cross section of the strip of profiled product have surprisingly revealed that, for a constant width of the strip of extruded profiled product (or for constant values of the pressure of the mixture upstream of the rolls), when there is a difference in speed between these two rolls, the thickness of the strip of profiled product tends to increase. This is explained by the fact that the product exiting the extruder adheres to one of the rolls, in particular to the first roll which serves as an applicator roller or, for certain elastomer mixtures, to the colder roll (which is kept at a temperature lower than that of the other roll by means specifically provided for this purpose), and that the other roll then supplies a greater output of material by being driven at a greater speed than the first roll. Thus, when the output of the second roll increases, with the strip of profiled product not being driven more quickly since it is turned on the first roll, which rotates less quickly than the second roll, an increase in the thickness of the strip of extruded profiled product is obtained.

Of course, conversely, it could be possible to keep the thickness constant (by ensuring a fixed difference in speed between the rolls that form the die) and to vary the width of the strip of profiled product by acting on the pressure in the cavity upstream of the rolls. This is obtained by varying the speed of the screw with respect to the speeds of the rolls, which remain constant, while having different values from one another.

Thus, by way of the difference between the speeds of rotation of the two rolls, this difference being obtained by the two rolls being driven in rotation independently of one another, one of the dimensions of the cross section of the strip of profiled product is controlled, the other dimension being controlled by the first control means which synchronize the speed of the first applicator roll and that of the extrusion screw. Thus, the two dimensions of the cross section of the strip of extruded product are controlled easily and continuously while the apparatus is operating.

Advantageously, said second control means comprise a sensor for measuring the thickness of the strip of profiled product and means for comparing the measured value of the thickness with a setpoint value of the thickness, and the speed of rotation of the second roll is controlled depending on the result of the comparison. Thus, by measuring the thickness of the strip immediately at the outlet of the nip between the rolls and by comparing said thickness with a setpoint value, the speed of the second roll is regulated rapidly.

Preferably, the speed of rotation of the second roll is directly linked to the speed of rotation of the first roll by a coefficient of proportionality. It has been established, during laboratory tests, that it is possible to experimentally determine a coefficient of proportionality which, for a predetermined elastomer mixture and a given apparatus, links the speeds of the two rolls depending on the thickness of the strip of profiled product.

Advantageously, the extrusion apparatus of an embodiment of the invention comprises a sensor for measuring the width of the strip of profiled product and means for comparing the measured value of the width with a setpoint value of the width, and the speed of rotation of the screw is controlled depending on the result of the comparison.

Such a measuring sensor makes it possible to directly detect the variation in the width and transmit it to the comparison means, which rapidly adjust the speed of the screw as a result. In a variant, a pressure sensor positioned in the barrel of the extruder upstream of the rolls could be used to adjust the speed of the screw such that the measured value of the pressure is equal to a setpoint value thereof.

Preferably, the speed of rotation of the screw is directly linked to the speed of rotation of the first roll by a coefficient of proportionality. The setpoint value of this coefficient of proportionality is determined experimentally for a given elastomer mixture and a given extrusion apparatus so as to obtain a strip of extruded profiled product with a constant thickness.

The width of the strip is controlled by the synchronization of the speed of the screw and that of the first roll and the thickness of the strip is controlled by suitably adjusting the speed of the second roll with respect to that of the first roll. Thus, by suitably controlling the speeds of rotation of the components of the apparatus, the width and the thickness of the cross section of the strip of profiled product are regulated independently, and thus strips of profiled product having different sections are obtained with one and the same mechanical configuration of the apparatus.

The object of an embodiment of the invention is also achieved by way of an extrusion method adapted for manufacturing a continuous strip of profiled product with the aid of an extrusion apparatus comprising a screw that is set in rotation in a fixed barrel having a feed inlet for elastomer mixture and an outlet provided with an extrusion nozzle which discharges into the nip formed between a first rotary roll and a second rotary roll that are made to rotate in opposite directions, the apparatus having first means for rotating the first roll and first control means, said first control means being able to synchronize the speed of rotation of the first roll with the speed of rotation of the screw, and second means for rotating the second roll, said second means being connected to second control means, wherein the second roll is rotated at a speed of rotation that is different from the speed of rotation of the first roll, and wherein the speed of rotation of the screw is regulated depending on the width of the strip of profiled product and the speed of rotation of the second roll is regulated depending on the thickness of said strip.

The second roll is driven in rotation with the aid of the second driving means depending on one of the dimensions of the cross section of the strip of extruded profiled product. Thus, the two dimensions of the cross section of the strip of extruded product are controlled easily and continuously while the apparatus is operating.

Advantageously, said first control means are connected to the means for driving the screw in order to regulate the speed of rotation of the screw depending on the width of the strip of profiled product and the apparatus comprises second control means that are connected to said second means for driving in rotation in order to regulate the speed of rotation of the second roll depending on the thickness of said strip.

Preferably, said second control means comprise a sensor for measuring the thickness of the strip of profiled product and means for comparing the measured value of the thickness with a setpoint value of the thickness, and in that the speed of rotation of the second roll is controlled depending on the result of the comparison.

Advantageously, said apparatus comprises a sensor for measuring the width of the strip of profiled product and means for comparing the measured value of the width with a setpoint value of the width, and the speed of rotation of the screw is controlled depending on the result of the comparison.

Preferably, said first roll is made to bear against the receiving surface of a profiled-product strip-laying means in order to serve as a roll for applying said strip. When said laying means is a tire-building drum, the circumferential speed of the first roll is equal to the circumferential speed of the receiving surface of the tire-building drum. This allows direct laying on the receiving surface, with a saving in manufacturing time, in particular when a narrow strip of rubber is laid by traverse winding on a tire-building drum.

BRIEF DESCRIPTION OF DRAWING

The following description is based on FIG. 1, which schematically shows an extrusion apparatus of an embodiment of the invention.

DETAILED DESCRIPTION OF SPECIFIC EMBODIMENTS

The extrusion apparatus shown in FIG. 1 comprises a screw 2 that is set in rotation by means for driving the screw (not visible in the drawing), such as an electric motor, for rotating inside a barrel 1. The barrel 1 has a cylindrical overall shape and has a feed inlet 3 for an elastomer mixture and an outlet 4 provided with an extrusion nozzle 5 which passes the elastomer mixture pushed by the screw 2 into the nip present between a first roll 6 and a second roll 7. The first roll 6 and the second roll 7 are driven in rotation in opposite directions. They form a roll die system having the purpose of profiling the elastomer mixture exiting the barrel 1 through the extrusion nozzle 5 into a strip form.

In the example shown in FIG. 1, the first roll 6 cooperates directly with a rotary tire-building drum 20 and as a result serves as a roll for applying the strip of profiled product P to the receiving surface of the drum. The speed of the first roll 6 corresponds substantially to the exit speed of the product and is adapted to the speed for laying the profiled product P on the tire-building drum 20. The first roll 6 is driven in rotation by a first drive motor at a speed of rotation ωr1 which corresponds to a given laying speed. The first drive motor is controlled by a programmer 10 in the memory in which the setpoint values of the speed for laying the profiled product P on the tire-building drum 20 are stored. The circumferential speed of the first roll 6 is equal to the circumferential speed of the tire-building drum 20, the direction of rotation being indicated by the arrows in FIG. 1.

The extrusion apparatus of an embodiment of the invention furthermore comprises means for synchronizing the speed of the first roll 6 and that of the screw 2. For this purpose, the first roll 6 and the screw 2 are each provided with a means for driving in rotation, for example an electric motor, and an optical encoder, and their speeds are synchronized by means of an axle control. Thus, a measuring means determines at each instant the speed of rotation Ωr1 of the first roll 6 and transmits this value to the control 14 controlling the speed of the screw Ωvis such that, at any instant, the speed of rotation of the screw Ωvis is equal to the product of the speed of rotation of the roll Ωr1 multiplied by a predetermined coefficient of proportionality Ksvis (Ω vis=K svis*Ω r1). This coefficient of proportionality Ksvis was determined experimentally for a predetermined elastomer mixture and a given extrusion apparatus so as to adapt the speed of the screw 2 to that of the first roll 6 in order to obtain a profiled element P of constant width.

The values of the coefficient of proportionality Ksvis are constant under normal operating conditions, but they can vary, in particular depending on the feed rate of the screw, or on variations in pressure in the cavity upstream of the extrusion nozzle 5 or in the viscosity of the mixture. This variation in the values of the coefficient of proportionality Ksvis can be assessed during the phase of learning and experimentally determining the coefficient of proportionality.

In order to correct these linearity errors, it is possible to introduce a loop 13 for correcting the speed of the screw by measuring the width "I" of the profiled element P directly at the outlet of the roll die so as to modify the setpoint value of the coefficient of proportionality depending on the setpoint value "I setpoint" of the width. For this purpose, the extrusion apparatus comprises means for measuring the width I of the profiled element P, such as a sensor 9 for measuring the width, said sensor being of the contactless type, for example a sensor that uses a laser beam. The correction loop 13 has a regulator 11 which compares the measured value of the width "I" with a setpoint value "I setpoint" stored in a memory 12 and, when the measured value is different from the setpoint value, the regulator 11 applies a corrected value of the coefficient of proportionality K svis to the control 14 controlling the speed of the screw.

In a variant of the invention, use is made of a pressure sensor (not shown in the drawing) which is positioned in the cavity upstream of the extrusion nozzle 5 and is connected to a loop for correcting the speed of the screw so as to keep the pressure measured in the cavity equal to a pre-established setpoint value. Thus, for a given elastomer mixture, a particular width of the profiled product P is attributed, by learning and experimental determination, to a pre-established pressure in the cavity. The setpoint values of the pressure and of the width are stored in a correspondence table which is used by a regulator to correct the value of the speed of the screw depending on the measured value of the pressure by applying a corrected coefficient of proportionality to the control controlling the speed of the screw, as described above. This is used when the extrusion apparatus is used with elastomer mixtures of which the fluidity is substantially constant over time and makes it possible to do away with the use of a sensor for measuring the width of the profiled product P.

According to an embodiment of the invention, the second roll 7 has its own means for driving in rotation, for example an electric motor, which are connected to second means for controlling the speed of rotation of the second roll 7 such that it can rotate at a speed $\Omega$ r2 different from the speed of rotation $\Omega$ r1 of the first roll 6. Advantageously, the second control means are connected to said second means for driving in rotation in order to regulate the speed of rotation $\Omega$ r2 of the second roll 7 depending on the measured thickness "e" of the strip of profiled product P. Thus, by means of independent driving of each roll, in particular by installing independent means for motorizing each roll, it is possible to regulate the speed of the second roll 7 while keeping the speed of the first roll 6 constant. It has surprisingly been found during laboratory tests that when the second roll 7 rotates more quickly than the first roll 6, the output of mixture into the nip between the rolls increases and, consequently, the thickness of the strip of profiled product P increases. This makes it possible to lay the profiled product P on the tire-building drum 20 at the correct speed, while being able to vary its thickness.

A number of means for regulating the speed of the second roll 7 depending on the measured thickness "e" of the product P can be envisaged. FIG. 1 illustrates an example of such regulating means in which said second control means are represented by a regulating loop 14 comprising a sensor 8 for measuring the thickness "e" of the strip of profiled product P, means 15 for comparing the measured value of the thickness "e" to a setpoint value of the thickness "e setpoint" stored in a memory 16, and means 17 for controlling the speed of the second roll 7. The sensor 8 for measuring the thickness is of the contactless type, for example a sensor that uses a laser beam.

During the tests carried out, it was established that the speed of rotation $\Omega$ r2 of the second roll 7 is directly linked to the speed of rotation $\Omega$ r1 of the first roll 6 by a coefficient of proportionality K sr, such that $\Omega$ r2=K sr*$\Omega$ r1, the coefficient of proportionality Ksr being determined experimentally for a predetermined elastomer mixture and a given extrusion apparatus so as to adapt the speed of the second roll 7 to that of the first roll 6 in order to obtain a profiled element P of constant thickness. For this purpose, the second roll 7 is provided with an optical encoder, and the speeds $\Omega$ r2 and $\Omega$r1 are synchronized by means of an axle control. Thus, a measuring means determines at each instant the speed of rotation $\Omega$r1 of the first roll 6 and transmits this value to the control 17 controlling the speed of the second roll $\Omega$r2 such that, at any instant, the speed of rotation of the second roll $\Omega$r2 is equal to the product of the speed of rotation of the first roll $\Omega$r1 multiplied by a predetermined coefficient of proportionality Ksr.

Thus, the width "I" of the strip of product P is controlled by the difference in speed of rotation between the first roll 6 and the screw 2 and the thickness "e" thereof is controlled by the difference in speed between the first roll 6 and the second roll 7. This makes it possible to vary the width and thickness of the strip of profiled product P while keeping the speed of rotation of the first roll, which is the one that lays the product on a downstream device, constant.

In addition, the increase in the thickness of the strip of profiled product P in order to arrive at the setpoint thickness "e setpoint" can be accompanied by a drop in the pressure in the cavity upstream of the extrusion nozzle 5. This drop in pressure causes the width measured "I" to decrease, is captured by the sensor 9 for measuring the width and taken into account by the correction loop 13, which corrects the speed of rotation of the screw 2 in order to re-establish the value of the width to the setpoint width "I setpoint". Thus, automatic regulation of the values of the thickness and of the width is obtained, while the laying speed is kept constant.

Further variants and embodiments of the invention can be envisaged without departing from the scope of the claims. Thus, the speed of rotation of the second roll can be adjusted manually depending on data supplied by the sensor for measuring the thickness.

The invention claimed is:

1. An extrusion apparatus adapted for manufacturing a continuous strip of profiled product, comprising:
   a screw that is set in rotation in a fixed barrel having a feed inlet for elastomer mixture, and an outlet provided with an extrusion nozzle which discharges into a nip formed between a first rotary roll and a second rotary roll that are made to rotate in opposite directions during operation of the apparatus,
   a first rotator for rotating the first rotary roll and a first controller that are able to synchronize a speed of rotation ($\Omega$ r1) of the first rotary roll and a speed of rotation ($\Omega$ vis) of the screw, and
   a second rotator for rotating the second rotary roll that is able to rotate the latter at a speed of rotation ($\Omega$ r2) that is different from the speed of rotation of the first rotary roll ($\Omega$ r1),
   wherein said first controller is connected to a screw driver for driving the screw in order to regulate the speed of rotation of the screw depending on the width of the strip of profiled product, and wherein the apparatus comprises a second controller connected to said second rotator for rotating in order to regulate the speed of rotation ($\Omega$ r2) of the second rotary roll depending on the thickness of said strip.

2. The extrusion apparatus according to claim 1, wherein the speed of rotation of the second roll is variable independently of the speed of rotation of the first roll.

3. The extrusion apparatus according to claim 1, wherein said second controller comprises a sensor for measuring the thickness of the strip of profiled product and a comparator for comparing the measured value of the thickness (e) with a setpoint value of the thickness (e setpoint), and wherein the speed of rotation ($\Omega$ r2) of the second roll is controlled depending on the result of the comparison.

4. The extrusion apparatus according to claim 3, wherein the speed of rotation $\Omega$ r2 of the second roll is directly linked to the speed of rotation $\Omega$ r1 of the first roll by a coefficient of proportionality K sr, such that $\Omega$ r2=K sr*$\Omega$ r1.

5. The extrusion apparatus according to claim 1, further comprising a sensor for measuring the width of the strip of profiled product and a comparer for comparing the measured value of the width with a setpoint value of the width (1 setpoint), and wherein the speed of rotation ($\Omega$ vis) of the screw is controlled depending on the result of the comparison.

6. The extrusion apparatus according to claim 5, wherein the speed of rotation of the screw $\Omega$ vis is directly linked to the speed of rotation Q r1 of the first roll by a coefficient of proportionality K svis, such that $\Omega$ vis=K svis*$\Omega$r1.

7. An extrusion method adapted for manufacturing a continuous strip of profiled product with the aid of an extrusion apparatus comprising:
   rotating a screw in a fixed barrel having a feed inlet for elastomer mixture and an outlet provided with an extrusion nozzle;
   discharging elastomer mixture from the extrusion nozzle into a nip formed between a first rotary roll and a second rotary roll,
   rotating the first rotary roll and the second rotary roll in opposite directions by a first rotator for rotating the first rotary roll and by a second rotator for rotating the second rotary roll, respectively,
   synchronizing the first rotator for rotating the first rotary roll by a first controller, said first controller being able to synchronize a speed of rotation ($\Omega$ r1) of the first roll with a speed of rotation ($\Omega$ vis) of the screw, and controlling the second rotator for rotating the second rotary roll, said second rotator for rotating the second rotary roll being connected to second controller, wherein the second rotary roll is rotated at a speed of rotation ($\Omega$ r2) that is different from the speed of rotation of the first roll ($\Omega$ r1), and wherein the speed of rotation of the screw is regulated depending on the width of the strip of profiled product and the speed of rotation ($\Omega$ r2) of the second roll is regulated depending on the thickness of said strip.

8. The method according to claim 7, wherein said second controller comprises a sensor for measuring the thickness of the strip of profiled product and a comparator for comparing the measured value of the thickness (e) with a setpoint value of the thickness (e setpoint), and in that the speed of rotation ($\Omega$ r2) of the second roll is controlled depending on the result of the comparison.

9. The method according to claim 7, wherein said apparatus further comprises a sensor for measuring the width of the strip of profiled product and a comparator for comparing the measured value of the width (l) with a setpoint value of the width (1 setpoint), and wherein the speed of rotation ($\Omega$ vis) of the screw is controlled depending on the result of the comparison.

10. The method according to claim 7, wherein said first roll is made to bear against a receiving surface of a profiled-product strip-laying means in order to serve as a roll for applying said strip.

11. The method according to claim 10, wherein said strip-laying means is a tire-building drum, and wherein the circumferential speed of the first roll is equal to the circumferential speed of the receiving surface of said tire-building drum.

* * * * *